United States Patent
Kanezaki et al.

(12) 
(10) Patent No.: US 6,524,365 B1
(45) Date of Patent: Feb. 25, 2003

(54) BEARING MADE OF GRAPHITE-DISPERSED COPPER-BASED SINTERED ALLOY AND MOTORIZED FUEL PUMP USING THIS BEARING

(75) Inventors: Noboru Kanezaki, Niigata (JP); Tsuneo Maruyama, Niigata (JP); Yoshio Ebihara, Kariya (JP)

(73) Assignees: Mitsubishi Materials Corporation, Tokyo (JP); Denso Corporation, Aichi (JP)

( * ) Notice: Subject to any disclaimer, the term of this patent is extended or adjusted under 35 U.S.C. 154(b) by 0 days.

(21) Appl. No.: 10/059,191

(22) Filed: Jan. 31, 2002

(51) Int. Cl.⁷ .............................. C22C 9/04; C22C 9/06
(52) U.S. Cl. ........................................... 75/243; 75/246
(58) Field of Search ..................... 75/246, 243

(56) References Cited

U.S. PATENT DOCUMENTS 4,579,712 A * 4/1986 Mori ........................ 148/532
5,972,070 A * 10/1999 Kondoh et al. ............. 148/432
6,165,246 A * 12/2000 Kira et al. .................. 428/545

FOREIGN PATENT DOCUMENTS

| JP | 57-70247 | 4/1982 |
| JP | 575-73150 | 5/1982 |
| JP | 07-118777 | 5/1995 |
| JP | 2001-192754 | 7/2001 |

* cited by examiner

Primary Examiner—Ngoclan Mai
(74) Attorney, Agent, or Firm—Rader, Fishman & Grauer PLLC

(57) ABSTRACT

A bearing for motorized fuel pumps comprising a graphite-dispersed copper-based sintered alloy which contains 10 to 25% by weight of Zn, 10 to 25% by weight of Ni, 0.1 to 0.9% by weight of P, and 1 to 8% by weight of C, the balance being Cu and unavoidable impurities, and which has a porosity of 5 to 25%, exhibits superior wear resistance to a high-pressure high-speed flow of a fuel.

2 Claims, 1 Drawing Sheet

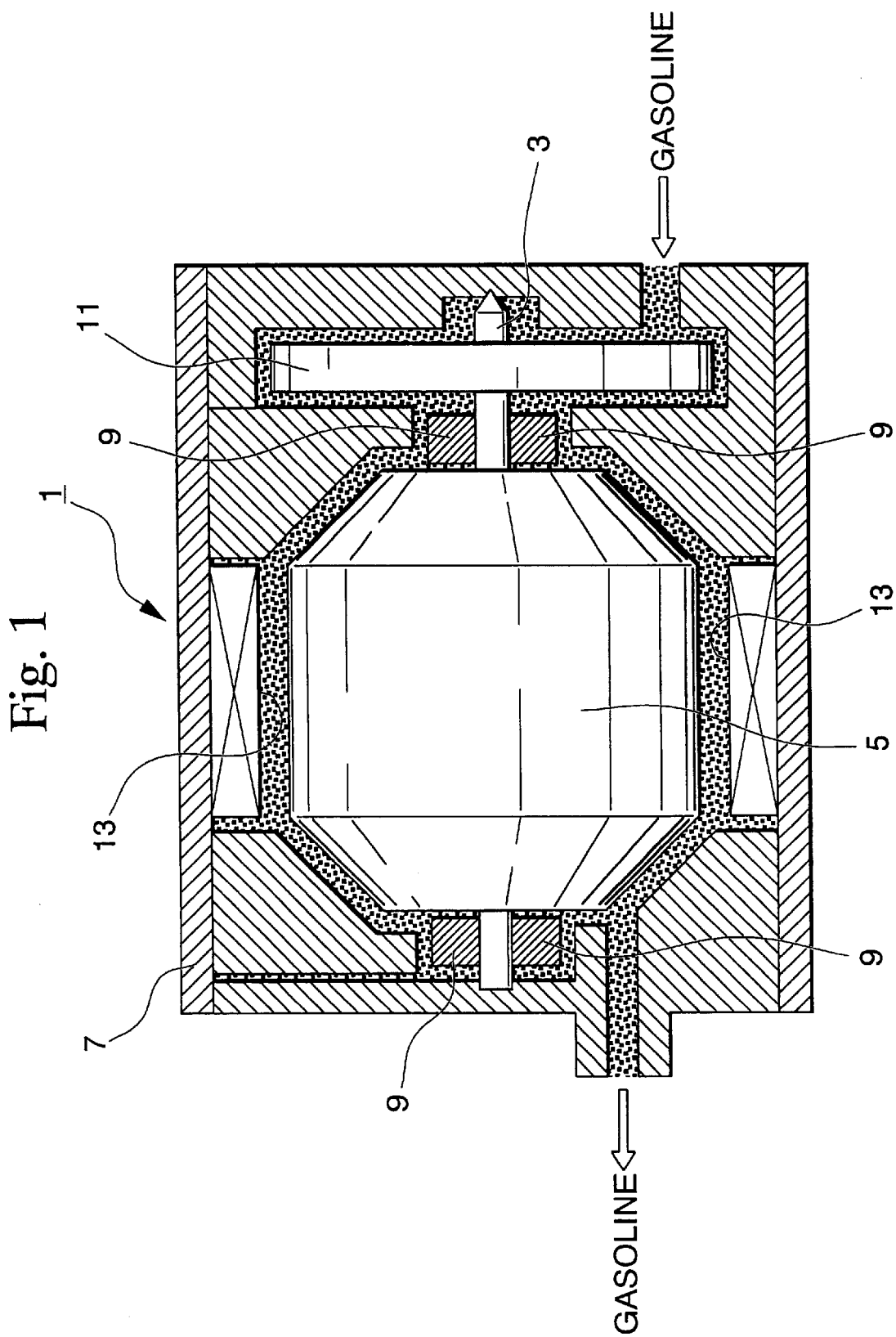

BEARING MADE OF GRAPHITE-DISPERSED COPPER-BASED SINTERED ALLOY AND MOTORIZED FUEL PUMP USING THIS BEARING

BACKGROUND OF THE INVENTION

1. Field of the Invention

The present invention relates to a bearing made of a graphite-dispersed copper-based sintered alloy, the bearing exhibiting superior wear resistance, particularly when used in a motorized fuel pump which is compact and which is to be operated at high speed.

2. Description of Related Art

Bearings which are structural elements of fuel pumps for gasoline engines and which are provided along a flow path of gasoline could be composed of a copper-based cast alloy comprising 10 to 25% of Zn and 10 to 25% of Ni ("%" herein and hereinafter indicates "% by weight"), the balance being Cu and unavoidable impurities.

As reduction in the weight and enhancement in performance of gasoline engines for automobiles, for example, have been remarkable recently, reduction in the size of fuel pumps has also been desired. However, a higher operation speed, i.e., a higher rotation speed, is required in order to make the conventional fuel pump compact, maintaining its discharge performance, and as a result, gasoline which is taken into the fuel pump flows at a high speed under a high pressure through the flow path formed of a narrower space. Under such conditions, the bearings, which are structural elements of the fuel pump, made of a copper-based cast alloy, wear very quickly, and the life of the bearings is relatively short.

BRIEF SUMMARY OF THE INVENTION

In view of the above situation, the inventors conducted research in order to develop bearings which are suitable for use in fuel pumps which are compact and are to be operated at high speed. As a result, the inventors found that a bearing comprising a graphite-dispersed copper-based sintered alloy which contains 10 to 25% of Zn, 10 to 25% of Ni, 0.1 to 0.9% of P, and 1 to 8% of C, the balance being Cu and unavoidable impurities, and which has a porosity of 5 to 25% exhibits superior wear resistance under conditions in which the bearing is exposed to a flow of a fuel (such as gasoline) at a high speed under a high pressure, and the inventors found that a motorized fuel pump using this bearing comprising the graphite-dispersed copper-based sintered alloy has a longer life even when the fuel pump is used for pumping a fuel containing sulfur or compounds thereof as an impurity. This is because frictional drag on the bearing from the high-pressure high-speed flow of the fuel is moderated by the pores on the bearing, and because even though the greater the number of pores formed, the greater the wear resistance of the bearing is reduced, such a reduction of the wear resistance is off set by a Cu—P compound, which is rigid and is dispersed in the matrix made of a solid solution phase of a Cu—Ni—Zn alloy, and by graphite, which is highly lubricating and is also dispersed in the matrix, and in addition, the Cu—Ni—Zn alloy, which forms the matrix, has superior strength and resistance to corrosion.

The present invention is based on the above findings in the research, and provides a bearing for a motorized fuel PUMP, which exhibits superior wear resistance to a high-pressure high-speed flow of a fuel (such as gasoline), the bearing comprising a graphite-dispersed copper-based sintered alloy which contains 10 to 25% of Zn, 10 to 25% of Ni, 0.1 to 0.9% of P, and 1 to 8% of C, the balance being Cu and unavoidable impurities, and which has a porosity of 5 to 25%, and provides a motorized pump comprising this bearing.

Next, reasons for limiting the composition and the porosity of the graphite-dispersed copper-based sintered alloy in the bearing of the present invention to the above ranges will be explained in the following.

(1) Composition (1-a) Zinc (Zn) and Nickel (Ni)

As explained above, Zn and Ni components can be dissolved in Cu in the solid state to form a matrix made of a solid solution phase of a Cu—Ni—Zn alloy, and have a function of maintaining the strength and the corrosion resistance of the bearing. With regard to Ni, the strength of the alloy tends to be reduced if the amount of Ni is less than 10% or is more than 25%. With regard to Zn, the corrosion resistance of the alloy tends to be reduced if the amount of Zn is less than 10%, while the strength of the alloy tends to be suddenly reduced if the amount of Zn is more than 25%. Accordingly, the range of the amount of Zn is determined to be 10 to 25%, and the range of the amount of Ni is determined to be 10 to 25%. Preferably, the amount of Zn is 15 to 20%, and the amount of Ni is 15 to 20%.

(1-b) Phosphorus (P)

The P component has a function of contributing to the enhancement of the strength of the bearing by improving the sintered state of the alloy, and has a function of enhancing the wear resistance of the bearing by forming a rigid Cu—P alloy which is dispersed in the matrix. However, if the amount of P is less than 0.1%, desired enhancing effects in the above functions cannot be obtained. On the other hand, if the amount of P is more than 0.9%, the strength of the alloy tends to be suddenly reduced. Accordingly, the range of the amount of P is determined to be 0.1 to 0.9%. Preferably, the amount of P is 0.3 to 0.6%.

(1-c) Carbon (C)

The C component is present mainly as graphite dispersed in the matrix. C component imparts excellent lubrication to the bearing, and thus has a function of contributing to enhancement in the wear resistance of the bearing. However, if the amount of C is less than 1%, desired enhancing effects in the above function cannot be obtained. On the other hand, if the amount of C is more than 8%, the strength of the alloy tends to be considerably reduced. Accordingly, the range of the amount of C is determined to be 1 to 8%. Preferably, the amount of C is 2 to 6%.

(2) Porosity

The pores dispersed in the matrix made of the Cu—Ni—Zn alloy have a function of moderating strong frictional drag and surface pressure to which the bearing is subjected by a high-pressure high-speed flow of a fuel, thus inhibiting wear of the bearing by such a flow. However, if the porosity of the alloy is less than 5%, the number of pores dispersed in the matrix is too low to satisfactorily yield the above effect. On the other hand, if the porosity of the alloy is greater than 25%, the strength of the bearing tends to be considerably reduced. Accordingly, the range of the porosity is determined to be 5 to 25%. Preferably, the porosity is 10 to 20%.

The bearing comprising the graphite-dispersed copper-based sintered alloy according to the present invention exhibits superior wear resistance not only as a bearing for a common fuel pump, but also as a bearing for a fuel pump which is compact and which is operated at a high speed, e.g., a bearing which is to be used exposed to a high-speed flow of a fuel (such as gasoline) and is subjected to high surface pressures. Accordingly, the bearing according to the present invention can sufficiently contribute to reduction of weights and enhancement of performances of engines such as gasoline engines.

BRIEF DESCRIPTION OF THE DRAWING

FIG. 1 is a schematic cross-sectional side view of a motorized fuel pump for a gasoline engine.

DETAILED DESCRIPTION OF THE INVENTION

The bearing made of a graphite-dispersed copper-based sintered alloy according to the present invention will be specifically explained with reference to examples. As material powders, 5 types of Cu—Ni—Zn alloy powders, i.e., a powder of a Cu—Ni—Zn alloy (Ni: 15.8%; Zn: 18.3%; Cu: balance), a powder of a Cu—Ni—Zn alloy (Ni: 16.9%; Zn: 18.0%; Cu: balance), a powder of a Cu—Ni—Zn alloy (Ni: 18.8%; Zn: 18.4%; Cu: balance), a powder of a Cu—Ni—Zn alloy (Ni: 17.4%; Zn: 16.4%; Cu: balance), and a powder of a Cu—Ni—Zn alloy (Ni: 17.3%; Zn: 19.9%; Cu: balance), each Cu—Ni—Zn powder alloy being produced by a water atomizing method and having an average particle diameter of 45 $\mu$m, a powder of a Cu—P alloy (P: 33%; Cu: balance) produced by a water atomizing method and having an average particle diameter of 45 $\mu$m, and a graphite powder having an average particle diameter of 75 $\mu$m were prepared. These material powders were combined in predetermined ratios, mixed for 40 minutes using a ball mill, and press-molded with a predetermined pressure between 150 and 300 MPa to form a green compact. This green compact was sintered in the atmosphere of ammonia decomposition gas, while the temperature was maintained at a predetermined temperature within a range between 750 to 900° C. for 40 minutes, to yield bearings 1 to 17 of the present invention comprising a graphite-dispersed copper-based sintered alloy which has composition and porosity as shown in Table 1 and which has a size of 9 mm (outer diameter)×5 mm (inner diameter)×6 mm (height). An arbitrary cross section of each of the thus-obtained bearings 1 to 17 of the present invention comprising a sintered alloy was observed with an optical microscope (magnification of 200×), and each of the bearings 1 to 17 showed a structure having a matrix of solid solution phase of Cu—Ni—Zn, in which a Cu—P alloy and graphite are finely dispersed, and having pores.

In addition, for the purpose of comparison, conventional bearings 1 to 9 each comprising a copper-based cast alloy which has a composition as shown in Table 1 and which has a size of 9 mm (outer diameter)×5 mm (inner diameter)×6 mm (height) were prepared.

A structure of an example of a motorized fuel pump for an engine (such as a gasoline engine) is shown by the schematic cross-sectional side view in FIG. 1. As shown in this figure, this fuel pump 1 has a structure such that rotational shafts 3 which are fixed to both ends of a rotor (armature) 5 are supported in a casing 7 by bearings 9, and an impeller 11 is provided at an end of one of the rotational shafts 3, whereby a narrow flow path for fuel (such as gasoline) is formed along the impeller 11, the circumference of the rotor (armature) 5, and a space (not shown) between the rotational shafts 3 and the bearings 9. Magnets 13 are provided on the inner wall of the casing 7, facing the circumference of the rotor 5. The action of this fuel pump is such that rotation of the rotor 5 causes rotation of the impeller 11, which allows the fuel to flow into the casing 7, the fuel passing the flow path for fuel formed along the impeller 11, the circumference of the rotor 5, and a space (not shown) between the rotational shafts 3 and the bearings 9, and flows out to be sent to the engine which is provided separately. According to FIG. 1, a small amount of fuel passes by the circumference of both bearings 9, pressurized by the impeller 11, runs through a fuel path (not shown) in the casing 7, and reaches the circumference of the rotor (armature) 5.

Each of the above bearings 1 to 17 according to the present invention and conventional bearings 1 to 9 was installed in a fuel pump having the above structure and having an outer size of 110 mm length×38 mm diameter. The fuel pump was put in a gasoline tank. A practical experiment was carried out under conditions in which the rotation speed of the impeller was 4,000 (lowest speed) to 10,000 (highest speed) r.p.m., the flow rate of gasoline was 0.05 (lowest rate) to 0.15 (highest rate) m$^3$/hour, the pressure on the bearing from the gasoline was 300 KPa at highest, and the duration of the experiment was 200 hours. Thus, gasoline was sent through a narrow space at a high speed so that the bearing was subject to a high pressure and was exposed to the gasoline flow at a high speed. After the experiment, the maximum depth of wear on the surface of the bearing was measured. The result of these measurements are also shown in Table 1.

TABLE 1

| Type | Composition (% by weight) | | | | | Porosity (%) | Max. depth of wear ($\mu$m) |
| | Ni | Zn | P | C | Cu + Impurities | | |
|---|---|---|---|---|---|---|---|
| Bearing according to the present invention | | | | | | | |
| 1 | 10.3 | 17.8 | 0.52 | 4.51 | Bal. | 5.3 | 1.2 |
| 2 | 15.4 | 17.3 | 0.51 | 4.63 | Bal. | 10.2 | 1.1 |
| 3 | 17.6 | 17.1 | 0.54 | 4.38 | Bal. | 18.1 | 1.0 |
| 4 | 20.1 | 17.9 | 0.48 | 4.54 | Bal. | 21.4 | 1.4 |
| 5 | 24.7 | 17.6 | 0.49 | 4.61 | Bal. | 24.7 | 1.9 |
| 6 | 17.8 | 10.2 | 0.50 | 4.39 | Bal. | 15.6 | 1.4 |
| 7 | 17.2 | 15.0 | 0.52 | 4.64 | Bal. | 17.1 | 1.2 |
| 8 | 18.0 | 19.8 | 0.47 | 4.42 | Bal. | 18.4 | 1.2 |
| 9 | 17.7 | 24.7 | 0.49 | 4.55 | Bal. | 21.5 | 1.5 |
| 10 | 17.5 | 17.9 | 0.11 | 4.55 | Bal. | 16.3 | 1.3 |
| 11 | 17.4 | 17.0 | 0.24 | 4.63 | Bal. | 19.8 | 1.2 |
| 12 | 17.9 | 17.5 | 0.76 | 4.46 | Bal. | 21.0 | 1.3 |
| 13 | 17.2 | 17.7 | 0.88 | 4.58 | Bal. | 24.3 | 2.0 |
| 14 | 17.6 | 17.8 | 0.53 | 1.07 | Bal. | 24.1 | 3.2 |
| 15 | 17.5 | 17.4 | 0.51 | 2.61 | Bal. | 10.3 | 2.2 |
| 16 | 17.7 | 17.2 | 0.54 | 6.78 | Bal. | 8.5 | 1.9 |
| 17 | 17.5 | 17.1 | 0.50 | 7.69 | Bal. | 5.3 | 1.7 |
| Conventional bearing | | | | | | | |
| 1 | 10.1 | 17.5 | — | — | Bal. | — | 13.4 |
| 2 | 15.3 | 17.4 | — | — | Bal. | — | 12.2 |
| 3 | 17.6 | 17.3 | — | — | Bal. | — | 12.6 |
| 4 | 20.6 | 17.7 | — | — | Bal. | — | 13.0 |
| 5 | 24.8 | 17.3 | — | — | Bal. | — | 13.4 |
| 6 | 17.2 | 10.2 | — | — | Bal. | — | 13.8 |
| 7 | 17.5 | 15.1 | — | — | Bal. | — | 13.6 |
| 8 | 17.6 | 20.7 | — | — | Bal. | — | 13.9 |
| 9 | 17.7 | 24.8 | — | — | Bal. | — | 14.4 |

From the results shown in Table 1, it is apparent that the bearings 1 to 17 according to the present invention comprising the graphite-dispersed copper-based sintered alloys exhibited superior wear resistance to a high-pressure high-speed flow of gasoline in comparison with conventional bearings 1 to 9 comprising copper-based cast alloys, due to the actions of pores dispersed in the matrix of the alloys and due to the actions of the rigid Cu—P alloy and the highly lubricating graphite.

What is claimed is:

1. A bearing comprising a graphite-dispersed copper-based sintered alloy which contains 10 to 25% by weight of Zn, 10 to 25% by weight of Ni, 0.1 to 0.9% by weight of P, and 1 to 8% by weight of C, the balance being Cu and unavoidable impurities, and which has a porosity of 5 to 25%.

2. A motorized fuel pump comprising a bearing according to claim 1.

* * * * *